though the new compounds embodied in this invention are referred to herein as halide phosphinates, it is understood by those skilled in the art that when $R_1$ and/or $R_2$ are alkoxy or phenyloxy the compounds are halide phosphonates or phosphates. However, in the interest of brevity, the term "phosphinate" used herein is also meant to include the compounds "phosphonates and phosphates" within its meaning.

United States Patent Office 3,432,532
Patented Mar. 11, 1969

3,432,532
HALO-CHROMIUM SALTS OF ACIDS OF PHOSPHORUS AND THEIR ESTERS
James Ping King, Elkins Park, Pa., assignor to Pennsalt Chemicals Corporation, Philadelphia, Pa., a corporation of Pennsylvania
No Drawing. Filed Aug. 13, 1965, Ser. No. 479,609
U.S. Cl. 260—438.5       11 Claims
Int. Cl. C07f 11/00, 9/28

ABSTRACT OF THE DISCLOSURE

A halo-chromium salt of an acid of phosphorus or its ester of the formula $ZCr(OPR_1R_2O)_2$, where Z is chlorine, bromine or iodine and $R_1$ and $R_2$ are inert organic groups, is prepared by contacting a halogenating agent having at least one active atom Z as defined above with a complex of the formula $Cr(OPR_1R_2O)_2 \cdot X$ where X is an organic molecule selected from the group consisting of lower aliphatic alcohols, furan, tetrahydrofuran, thiophene, tetrahydrothiophene and dioxane. The halo-chromium salts are converted to coordination polymers by hydrolysis. The polymers, which were previously known, are useful as coatings, films, and fibers, and as grease thickeners and oil viscosity stabilizers.

---

This invention relates to the preparation of novel halides derived from complexes of chromium (II) phosphinates and to the preparation of certain coordination polymers from said halides. More particularly, the invention is concerned with compounds and their method of preparation, said compounds having the general formula $ZCr(OPR_1R_2O)_2$ wherein $R_1$ and $R_2$ are inert organic groups, and Z is chlorine, bromine or iodine. The invention is also concerned with the process which comprises hydrolyzing the aforesaid compounds to produce coordination polymers comprised of the repeating unit $$[Cr(H_2O)(OH)(OPR_1R_2O)_2]$$

The $R_1$ and $R_2$ groups in the above formulae are organic groups, which may be the same or different, such as alkyl, aryl, aryloxy and alkoxy. Preferably, $R_1$ and $R_2$ are hydrocarbon alkyl or aryl groups having from one to ten carbon atoms such as, for example, methyl, ethyl, propyl, isopropyl, butyl, hexyl, octyl, phenyl, tolyl, xylyl, naphthyl and the like. Other groups represented by $R_1$ and $R_2$ include methoxy, ethoxy, and other alkoxy groups having up to ten carbon atoms, phenyloxy, and the like. Al- The copending application of James P. King and Burton P. Block, Ser. No. 479,621, filed Aug. 13, 1965, describes new complexes derived from chromium (II) phosphinates and the preparation thereof, which complexes are of the general formula $Cr(OPR_1R_2O)_2 \cdot X$ where $R_1$ and $R_2$ are as defined above, and X is a neutral organic molecule coordinated with the chromium. The chromium atom of the complex is characterized by having a relatively unstable +2 valence which can be oxidized to the stable trivalent oxidation state and has in its trivalent state a coordination number of six (i.e., an octahedral spatial configuration). Briefly stated, the complexes are prepared by treating the acetate of bivalent chromium with phosphinic acid of the formula $$R_1R_2P(O)OH$$

in a solvent consisting essentially of the neutral organic compound. The neutral organic molecule (X) can be a member selected from the group consisting of lower aliphatic alcohols (e.g., methanol, ethanol, isopropanol and butanol) and five and six membered ring heterocyclic compounds wherein the non-carbon ring member is oxygen or sulfur, such as furan, tetrahydrofuran, thiophene, tetrahydrothiophene, dioxane and the like. Preferably, X is a lower aliphatic alcohol or a heterocyclic compound containing a five membered ring. The complexes are in general crystalline in nature and extremely air sensitive.

In accordance with the present invention, it has been discovered that reacting the aforesaid complex with a halogenating agent produces a halide phosphinate of trivalent chromium according to the reaction below wherein the halogen Z is substituted for the organic molecule X of the complex.

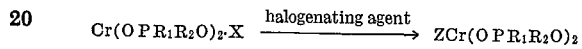

$$Cr(OPR_1R_2O)_2 \cdot X \xrightarrow{\text{halogenating agent}} ZCr(OPR_1R_2O)_2$$

where $R_1$ and $R_2$ are as defined above and the halogen Z is chlorine, bromine or iodine. The above compounds are valuable intermediates in the preparation of certain coordination polymers as set forth hereinbelow.

It has also been discovered, in accordance with this invention, that hydrolysis of the aforesaid halide phosphinate, i.e., via a simple reaction with water, produces polymers composed of the repeating unit $$[Cr(H_2O)(OH)(OPR_1R_2O)_2]$$

These coordination polymers are described in detail in the copending application of Anthony J. Saraceno, filed July 15, 1964, Ser. No. 382,924, now U.S. Patent 3,275,-574. Said polymers are characterized by having an intrinsic viscosity, as measured in chloroform at 31° C., within the range of about 0.08 to 1.0. They are useful for films, fibers and coatings, as thickeners, viscosity stabilizers and the like.

PREPARATION OF THE HALIDE PHOSPHINATE

As previously stated, the halide phosphinate of this invention is obtained by reacting the complex $$Cr(OPR_1R_2O)_2 \cdot X$$

with a halogenating agent, whereby the adduct X is replaced by a halogen Z bonded to the chromium. The term "halogenating agent" refers to any compound or element containing at least one active halogen atom Z, which atom Z can be transferred to the aforesaid complex and replace the neutral organic molecule X, and further, which halogenating agent simultaneously oxidizes the chromium atom from +2 to +3 valence. Suitable halogenating agents include elemental chlorine, bromine and iodine which are represented by $Cl_2$, $Br_2$ and $I_2$; the phosphorous pentahalides; easily reduced metal halides, for example, silver chloride, mercurous chloride, mercuric chloride, antimony chloride, stannic chloride, ceric chloride, ferric chloride, and the like, and the corresponding bromides; halogenated alkanes having 1 to 10 carbon atoms, preferably 1 to 3 carbon atoms, and halogenated alkenes having 1 to 10 carbon atoms, preferably 2 to 4 carbon atoms, for example, carbon tetrachloride, chloroform, monochloromethane, ethylene dichloride, trichloroethane, trichloroethylene, perchloroethylene, methylene chloride, perchloroethane, and the like and the corresponding bromides and iodides. The terms halogenated alkanes and alkenes thus include perhalogenated alkanes and perhalogenated alkenes in their meanings.

The reaction between the phosphinate complex and the halogenating agent can be carried out at a temperature within the range of about −80° C. to 180° C., depending on the type of halogenating agent employed, with from about 30 to about 80° C. being preferred. The molar ratio of the halogenating agent to the phosphinate complex is generally at least 1:1, and usually a ratio of from about 1:1 to about 1.5:1 is adequate. The reaction is generally completed in from about 10 to 120 minutes. Because of the sensitivity of the phosphinate complex to oxygen, it is desirable to exclude air from the reactants by use of a protective blanket of an inert gas such as nitrogen, argon or carbon dioxide. In addition, because of the sensitivity of the halide phosphinate product to moisture, the reaction is advantageously carried out under anhydrous conditions. It is convenient and advantageous, although not necessary, to carry out the reaction in an inert liquid medium such as an inert organic solvent, for example, benzene, toluene, xylene, o-dichlorobenzene, or an inert organic diluent such as heptane, hexane, petroleum ether, and the like. The only critical restrictions with regard to the reaction medium are that the medium should not contain an active hydrogen atom or an active halogen atom, nor be an oxidizing agent; for instance, alcohols and halogenated alkanes and halogenated alkenes should not be used. The product is separated from the solvent when such is used by evaporation of the solvent, or by precipitation therefrom by the addition of a non-solvent such as diethyl ether, n-hexane or petroleum ether, followed by filtration or centrifugation. When a nonsolvent diluent is used as the reaction medium product recovery is merely by filtration or the like.

PREPARATION OF POLYMERS

Coordination polymers are prepared by hydrolysis of the halide phosphinate via the reaction:

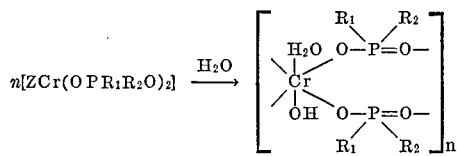

where $n$ is a number of such magnitude that the intrinsic viscosity of the polymer, determined in chloroform solvent at 31° C., ranges from about 0.08 to about 1.0. As stated earlier, these polymers are described at length in the copending application of Anthony J. Saraceno, filed July 15, 1964, Ser. No. 382,924, now U.S. Patent 3,275,574, and a further description thereof is deemed unnecessary herein.

In carrying out the hydrolysis, it is desirable that the amount of water be in excess of that required to stoichiometrically react with the halide phosphinate. The temperature of the hydrolysis reaction may vary from about 10 to about 100° C., however, ambient temperatures are preferred, e.g., from about 20 to 30° C. The reaction is fairly rapid and is usually completed in from about 10 to about 80 minutes. The hydrolysis rate may be enhanced by incorporation of a small amount of alkali metal hydroxide, e.g., NaOH or KOH, in the water, which material also serves to neutralize the by-product hydrogen halide. The polymer, as well as the halide phosphinate precursor, is water-insoluble, and is recovered from the reaction slurry by filtration or centrifugation, and then dried at temperatures up to about 80° C., subsequent to optional water washing to remove occluded byproduct acids or salts.

The examples that follow are presented to illustrate and clarify the described invention and should not be construed as limitative of the scope thereof.

Example I 6.88 grams (0.0158 mole) of the complex

[Cr[OP(CH$_3$)(C$_6$H$_5$)O]$_2$·tetrahydrofuran]

where CH$_3$ is methyl and C$_6$H$_5$ represents phenyl, is dissolved in 120 ml. of deaerated benzene in a 250 ml. flask equipped with a magnetic stirring bar. The solution is maintained under a blanket of nitrogen. 2.67 grams (0.0158 mole) of carbon tetrachloride in 25 ml. of benzene solvent is charged thereto and the bright blue color of the solution of complex turns to dark-brown. The reaction mixture is refluxed at about 80° C. for three hours and then allowed to cool to room temperature whereupon the gentle nitrogen purge is stopped. About 100 ml. of the benzene is removed by distillation and 125 ml. of anhydrous diethyl ether is added to the solution to precipitate a pink tan solid which is isolated under anhydrous conditions and dried under high vacuum at room temperature. The product, which is recovered in about 100% yield (6.0 grams), is chlorobis(methylphenylphosphinato)chromium (III) having the formula ClCr[OP(CH$_3$)(C$_6$H$_5$)O]$_2$ as confirmed by infrared spectral analysis.

Elemental analysis of the product is performed with the results: C, 42.55; H, 4.46; Cl, 9.20; Cr, 12.3; P, 15.82. Calculated for C$_{14}$H$_{16}$ClCrO$_4$P$_2$: C, 42.49; H, 4.02; Cl, 8.92; Cr, 13.1; P, 15.58.

Upon exposure to moisture, the product turns from pink-tan to green and the infrared spectrum indicates the presence of bound water. However, it has indefinite shelf-life in a moisture-free atmosphere.

0.5 part of the above-prepared chlorobis(methylphenylphosphinato)chromium is added to 30 parts of water and the mixture is vigorously agitated for one hour at room temperature. The resulting green solid is isolated by filtration and dried at 110° C. and is identified by its infrared spectrum as a polymer having the repeating unit

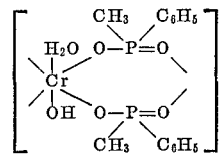

Elemental analysis thereof shows C, 42.69; H, 4.70; Cr. 12.4; P, 16.08. Calculated for C$_{14}$H$_{19}$CrO$_6$P$_2$: C, 42.33; H, 4.82; Cr, 13.1; P, 15.6.

Example II

A solution of 6.6 grams (0.0423 mole) of carbon tetrachloride in 20 ml. of benzene is added dropwise to a suspension of 20 grams (0.0395 mole) of the complex (Cr[OP(C$_6$H$_5$)$_2$O]$_2$·tetrahydrofuran) in 250 ml. of benzene under a nitrogen atmosphere to produce a dark brown solution which is then refluxed for 30 minutes at about 80° C. and then cooled to room temperature. About 240 ml. of benzene are removed by distillation and 300 ml. of n-hexane are added to the approximately 30 ml. of solution remaining to precipitate a pink-tan solid which is isolated under anhydrous conditions and dried under high vacuum. The product is identified by infrared spectral analysis as chlorobis(diphenylphosphinato)chromium (III), i.e., ClCr[OP(C$_6$H$_5$)$_2$O]$_2$.

Two grams of the foregoing compound are mixed with 50 ml. of distilled water at room temperature for one hour. Upon contact with water the pink-tan solid immediately turns green. The green product is recovered by filtration and dried at 110° C. the infrared spectrum confirms that it is a polymer comprised of the unit Cr(H$_2$O)(OH)(OP[C$_6$H$_5$]$_2$O)$_2$ Example III A solution of 2.1 grams (0.0135 mole) of carbon tetrachloride in 20 ml. benzene is added dropwise to a solution of 3.3 grams (0.01064 mole) of the complex

[Cr[OP(CH$_3$)$_2$O]$_2$·tetrahydrofuran]

in 175 ml. deoxygenated benzene to give a gray precipitate. After stirring the mixture for 2.5 hours at reflux temperature, the gray precipitate becomes pink-tan in color. The solid product is recovered under a nitrogen atmosphere and is vacuum dried. It is identified by its infrared spectrum as chlorobis(dimethylphosphinato)-chromium (III), i.e., ClCr[OP(CH$_3$)$_2$O]$_2$. When exposed to moisture in the atmosphere, the color of the compound changes from pink-tan to green.

Examples IV–VI

The tetrahydrofuran complex starting material used in Example I is reacted in a series of runs with the following halogenating agents in benzene solvent at a temperature of about 30° C.; chloroform, silver chloride and mercuric chloride. The product in each instance is chlorobis(methylphenyl-phosphinato)chromium (III).

Example VII

Gaseous chlorine is passed through a solution of the complex [Cr[OP(CH$_3$)(C$_6$H$_5$)O]$_2$·tetrahydrofuran] in o-dichlorobenzene solvent for about 20 minutes at 30° C. Nonsolvent n-hexane is then added to the solution to precipitate the chlorobis(methylphenylphosphinato)chromium (III) product which is recovered by filtration.

Examples VIII–X

In three runs, liquid bromine, methyl iodide and chloroform, respectively, are added dropwise to solutions of the complex [Cr[OP(C$_8$H$_{17}$)$_2$O]$_2$·CH$_3$OH] in o-dichlorobenzene solvent maintained at about 30° C. The reactants are mixed for 10 minutes, and then n-hexane is added to the solutions to precipitate, respectively, bromobis(dioctylphosphinato)-chromium (III), iodobis(dioctylphosphinato)chromium (III) and chlorobis(dioctylphosphinato)chromium (III). These products are recovered by filtration and each stirred with water at about 30° C. to give the coordination polymer having the repeating unit [Cr(H$_2$O)(OH)[OP(C$_8$H$_{17}$)$_2$O]$_2$].

I claim:

1. A halo-chromium salt of an acid of phosphorus or its ester of the formula ZCr(OPR$_1$R$_2$O)$_2$ where Z is chlorine, bromine or iodine and R$_1$ and R$_2$ are independently selected from the group consisting of alkyl groups having up to ten carbon atoms, hydrocarbon aryl groups having up to ten carbon atoms, alkoxy groups having up to ten carbon atoms and phenyloxy.

2. A halo-chromium salt or ester in accordance with claim 1 wherein Z is chlorine.

3. Chlorobis (methylphenylphosphinato) chromium (III) of the formula ClCr[OP(CH$_3$)(C$_6$H$_5$)O]$_2$.

4. Chlorobis(diphenylphosphinato)chromium (III) of the formula ClCr[OP(C$_6$H$_5$)$_2$O]$_2$.

5. Chlorobis(dimethylphosphinato)chromium (III) of the formula ClCr[OP(CH$_3$)$_2$O]$_2$.

6. Chlorobis(dioctylphosphinato)chromium (III) of the formula ClCr[OP(C$_8$H$_{17}$)$_2$O]$_2$.

7. A method for preparing a halo-chromium salt of an acid of phosphorus or its ester of the formula $$ZCr(OPR_1R_2O)_2$$

where Z is chlorine, bromine or iodine and R$_1$ and R$_2$ are independently selected from the group consisting of alkyl groups having up to ten carbon atoms, hydrocarbon aryl groups having up to ten carbon atoms, alkoxy groups having up to ten carbon atoms and phenyloxy which comprises contacting a halogenating agent having at least one active halogen atom Z under anhydrous conditions and a nonoxidizing atmosphere with a complex of the formula Cr(OPR$_1$R$_2$O)·X where R$_1$ and R$_2$ are as defined above and X is a neutral organic molecule selected from the group consisting of lower aliphatic alcohols, furan, tetrahydrofuran, thiophene, tetrahydrothiophene and dioxane.

8. The method of claim 7 wherein the halogenating agent is a chlorinating agent.

9. The method of claim 7 wherein the reactants are contacted in an inert, organic liquid medium.

10. The method of claim 9 wherein the halogenating agent is a chlorinating agent.

11. The method of claim 10 wherein the liquid medium is an inert organic solvent and the chlorinating agent is a halogenated alkane having 1 to 10 carbon atoms.

References Cited

UNITED STATES PATENTS

| | | | |
|---|---|---|---|
| 2,346,155 | 4/1944 | Denison | 260—63 |
| 3,197,436 | 7/1965 | Block | 252—32 |
| 3,275,574 | 9/1966 | Saraceno | 260—438.5 XR |

OTHER REFERENCES

Chemical Abstracts, vol 51, p. 12729g (1957).

TOBIAS E. LEVOW, *Primary Examiner.*

H. M. SNEED, *Assistant Examiner.*

U.S. Cl. X.R.

260—2